Nov. 10, 1970 Q. BERG 3,539,974

HEADER BLOCK ASSEMBLY

Original Filed Aug. 21, 1967

INVENTOR.
QUENTIN BERG

BY Whittemore Hulbert + Belknap

ATTORNEYS

United States Patent Office 3,539,974

Patented Nov. 10, 1970

3,539,974
HEADER BLOCK ASSEMBLY

Quentin Berg, % Berg Electronics, Inc., York Expressway, New Cumberland, Pa. 17070

Original application Aug. 21, 1967, Ser. No. 662,147. Divided and this application Apr. 17, 1969, Ser. No. 817,010

Int. Cl. H01r *21/02, 5/04*

U.S. Cl. 339—157 5 Claims

ABSTRACT OF THE DISCLOSURE

A header block assembly for interconnecting two circuit elements formed of a number of insulating spacers secured together with contact wires extending between two edges of the assembly along the interfaces between the spacers.

This application is a division of my copending application Serial No. 662,147, filed Aug. 21, 1967, for "Connector Block."

The invention relates to a header block assembly for interconnecting circuit boards and connector blocks or other circuit elements. The assembly is made up from a number of molded plastic spacers having wire-receiving grooves in interface surfaces. Contact wires are fitted in the grooves with the wire ends extending past the spacers. The spacers are then secured together to form the header assembly.

Preferably the spacers are wafer-like with two parallel side faces which are secured to adjacent spacers. The wire-receiving grooves are formed in one of the faces and the other face is flat. A recess may be provided adjacent the ends of the wires projecting from the assembly in order to prevent solder wicking between adjacent wires when the assembly is soldered to a circuit board.

Figure 1:
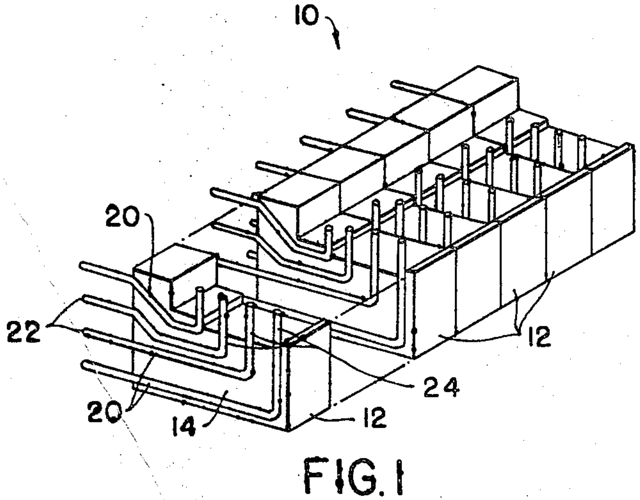
FIG. 1 is an exploded perspective view of a header block assembly.
Figure 2:
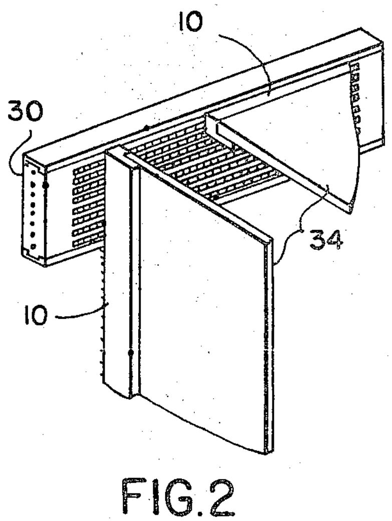
FIG. 2 illustrates the use of the header block assembly.
Figures 3, 4:
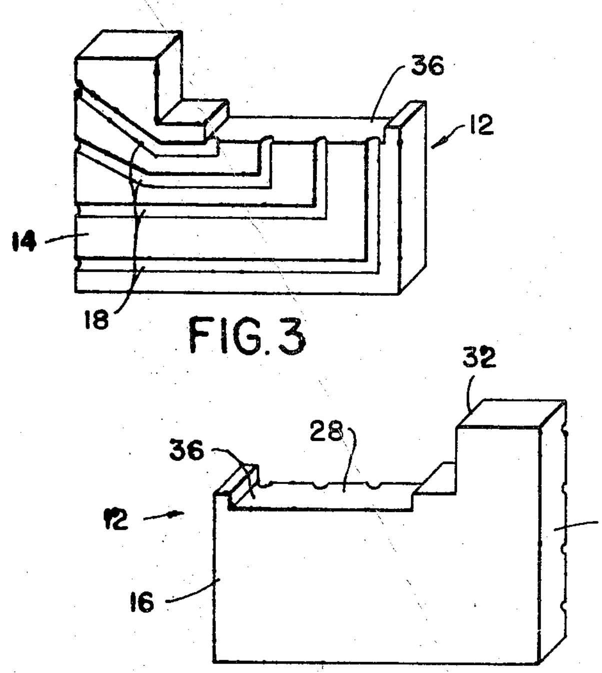
FIGS. 3 and 4 are perspective views of different sides of spacers used to form the body of the assembly.
Figure 5:
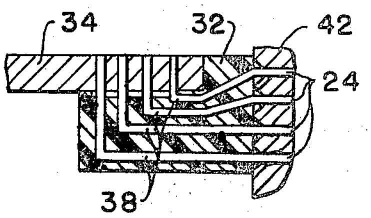
FIGS. 5 and 6 are sectional views illustrating the use of the assembly.
Figure 6:
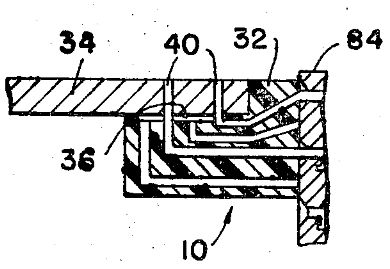

Header block 10 is formed from a plurality of wafer or spacer elements 12 which are sandwiched together at adjacent side faces 14 and 16 along the length of the header block. The wafer elements 12 may be molded or formed from a suitable plastic or other insulating material. Side face 14 of each wafer element is provided with a number of wire-receiving grooves 18. Contact wires 20 are fitted within grooves 18 with the ends 22 and 24 thereof projecting outwardly of the wafers normal to two adjacent side walls 26 and 28. Contact wire ends 22 are spaced along the rear wall of the header block 10 as illustrated in FIGS. 1, 5 and 6. The other ends 24 of contact wires 20 project outwardly of header block side wall 28 which is normal to rear wall 26. An abutment 32 extends upwardly from side wall 28 adjacent the rear wall to provide a circuit board stop for orienting the header block relative to a circuit board 34 as shown in FIGS. 5 and 6. The contact wire ends 24 fit into holes in the circuit board so that when the circuit board is soldered, electrical connections are formed between the contact wires and printed circuit paths on the circuit board. The contact wire ends 24 project upwardly from the header block through a shallow groove 36 so that the bottom of the groove 36 and the circuit board 34 adjacent ends 24 are separated and solder wicking between the contact wires 20 is prevented when the wires are soldered to the circuit board.

Grooves 18 are formed in wafer side face 14, and side face 16 which parallels face 14 is planar. When the wafers are sandwiched together to form the assembly, the contact wires are confined within the grooves as illustrated in FIG. 1.

By use of a header block assembly of the type described where the body of the assembly is formed by securing a number of spacers together with contact wires confined in grooves at the interface between adjacent spacers, it is possible to achieve the high contact wire density required for making the interconnections between circuit elements of electronic computers and other electronic apparatus. The header block is inexpensive to make and, because the wafer or separator elements are molded prior to positioning of the contact wires in grooves 18, there is no problem of flash formation on the ends of the wires.

As illustrated in FIG. 5, the header block may be used with four wires 38 positioned in the wire-receiving grooves 18. As illustrated in FIG. 6, the block may be used with two wires 40 positioned in the grooves. The header block of FIG. 5 is used to provide an interconnection between the circuit board and a connector block 42 in which the wire receiving recesses are closely spaced along the plane of wire ends 24. In the connector block 42 of FIG. F the wire receiving recesses are spaced further apart than in connector block 42 so that only two contact wires are fitted in the wafer grooves. Thus a header block assembly formed from wafers or spacers 12 may be used for forming connections between circuit boards and connector blocks having wire-receiving cavities arranged in different spacing.

While I have illustrated and described a preferred embodiment of my invention, it is understood that this is capable of modification, and I therefore do not wish to be limited to the precise details set forth.

What I claim as my invention is:

1. A header assembly for establishing electrical connections between two circuit elements comprising a plurality of like groups of contact wires with the groups lying in parallel planes, the wires in each group positioned with the ends of the wires arranged in sets, the wire ends in one set extending in a first direction and the wire ends in another set extending in a direction perpendicular to said first direction, and a plurality of insulating spacers secured together to form the body of said assembly, said spacers including a plurality of wire-receiving grooves at the interfaces between adjacent spacers, each wire being positioned in a groove with the ends thereof projecting outwardly of the assembly, said spacers being recessed adjacent one set of wire ends projecting therefrom to prevent solder wicking between such ends.

2. A header assembly for establishing electrical connections between two circuit elements comprising a plurality of like wafer elements formed of insulation material and each having opposite parallel side faces, said elements being sandwiched together at adjacent side faces to form an elongate insulating block, first and second mutually perpendicular side walls on said block running the length thereof, and a plurality of contact wires embedded within the block at side faces between adjacent wafer elements, said wires running from said first side wall to said second side will with the ends thereof spaced laterally and extending perpendicularly outwardly of said side walls to permit the attachment of circuit elements to the assembly, one of said side walls being recessed along the length thereof to form a shallow anti-solder wicking groove, the wire ends at such side wall projecting outwardly from said groove.

3. A header assembly for establishing electrical connections between two circuit elements comprising a plurality of like wafer elements formed of insulating material and each having opposite parallel side faces, said elements being sandwiched together at adjacent side faces to form an elongate insulating block, first and second mutually perpendicular side walls on said block running the length thereof, and a plurality of contact wires embedded within the block at side faces between adjacent wafer elements, said wires running from said first side wall to said second side wall with the ends thereof spaced laterally and extending perpendicularly outwardly of said side walls to permit the attachment of circuit elements to the assembly, one of said side walls being recessed adjacent the wire ends projecting therefrom to prevent solder wicking between such ends.

4. A header assembly for establishing electrical connections between two circuit elements comprising a plurality of like wafer elements formed of insulating material and each having opposite parallel side faces, said elements being sandwiched together at adjacent side faces to form an elongate insulating block, first and second mutually perpendicular side walls on said block running the length thereof, and a plurality of contact wires embedded within the block at side faces between adjacent wafer elements, said wires running from said first side wall to said second side wall with the ends thereof spaced laterally and extending perpendicularly outwardly of said side walls to permit the attachment of circuit elements to the assembly, portions of wafer elements projecting above one side face to one side of such side face to facilitate locating of a circuit element relative to such side face for forming electrical connections with said contact wires.

5. A header assembly for establishing electrical connections between two circuit elements comprising a plurality of like groups of contact wires with the groups lying in parallel planes, the wires in each group positioned with the ends of the wires arranged in sets, the wire ends in one set extending in a first direction and the wire ends in another set extending in a second direction, an insulating body for said assembly with said wires embedded within said body and with said wire ends projecting from said body, and anti-solder wicking means in said body adjacent one set of wire ends projecting therefrom to prevent solder wicking between such ends, wherein said anti-solder wicking means comprises a recess formed in said body with such ends projecting from the bottom of said recess.

References Cited

UNITED STATES PATENTS

| | | | |
|---|---|---|---|
| 2,864,977 | 12/1958 | Witt et al. | |
| 3,226,669 | 12/1965 | Lutz | 339—198 |
| 3,264,597 | 8/1966 | Gammel. | |

FOREIGN PATENTS

| | | |
|---|---|---|
| 998,731 | 9/1951 | France. |
| 230,213 | 9/1960 | Austrailia. |

MARVIN A. CHAMPION, Primary Examiner

L. J. STAAB, Assistant Examiner

U.S. Cl. X.R.

339—17, 210, 275